United States Patent [19]

Asplund

[11] Patent Number: 5,379,223
[45] Date of Patent: Jan. 3, 1995

[54] INERTIAL MEASUREMENT AND NAVIGATION SYSTEM USING DIGITAL SIGNAL PROCESSING TECHNIQUES

[75] Inventor: Mark D. Asplund, Olathe, Kans.

[73] Assignee: Allied Signal Inc., Morris Township, Morris County, N.J.

[21] Appl. No.: 901,046

[22] Filed: Jun. 19, 1992

[51] Int. Cl.$^6$ .................. G01C 19/00; G06G 7/78
[52] U.S. Cl. .................. 364/434; 364/453; 329/325; 375/81
[58] Field of Search ........... 364/443, 449, 434, 453; 329/325, 304, 307, 308; 375/81

[56] References Cited

U.S. PATENT DOCUMENTS

| | | | |
|---|---|---|---|
| 4,321,678 | 3/1982 | Krogmann | 364/453 |
| 4,914,598 | 4/1990 | Krogmann et al. | 364/434 |
| 4,970,469 | 11/1990 | Kovitz | 329/325 |
| 5,057,835 | 10/1991 | Factor et al. | 340/995 |
| 5,067,138 | 11/1991 | Van Rens et al. | 375/81 |
| 5,173,927 | 12/1992 | Strömmer et al. | 375/81 |
| 5,241,567 | 8/1993 | Shimakata | 375/82 |

*Primary Examiner*—Gary Chin
*Assistant Examiner*—Susan Wieland
*Attorney, Agent, or Firm*—Howard G. Massung

[57] ABSTRACT

An inertial measurement and navigation system using a multisensor which provides analog acceleration and rate information to an analog to digital converter whose digital output is processed by a digital demodulator and fed to an AHRS systems processor whose output is fed to a digital to analog converter. Output information from the digital to analog converter can be stored or used to provide information to the pilot oil cockpit displays. The digital demodulator includes a phase locked loop comprising a Hilbert transform phase detector, a first order IIR loop filter and a digital controlled oscillator which provides in-phase and quadrature reference signals used in demodulation.

3 Claims, 6 Drawing Sheets

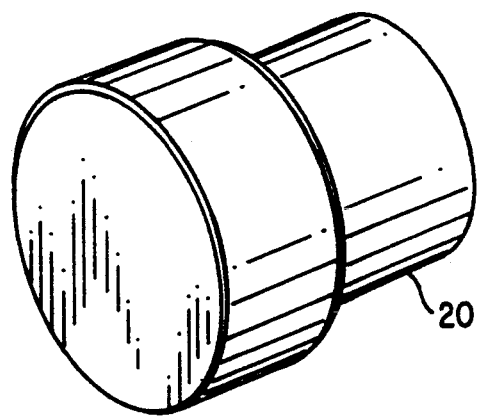
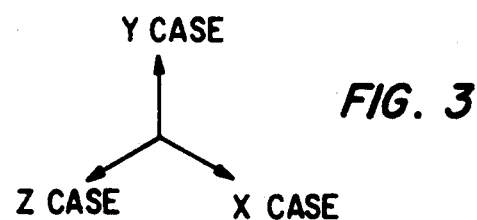
FIG. 3
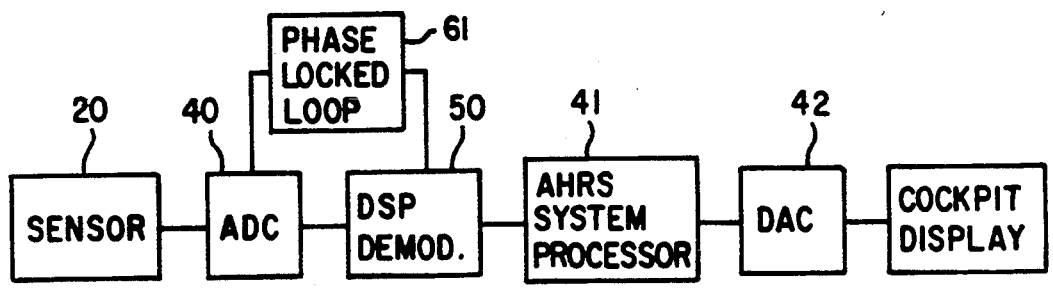
FIG. 7

INERTIAL MEASUREMENT AND NAVIGATION SYSTEM USING DIGITAL SIGNAL PROCESSING TECHNIQUES

BACKGROUND OF THE INVENTION

1. Field of the Invention

This invention relates to inertial measurement and navigation systems and more specifically to the use of digital signal processing techniques with an inertial multisensor.

2. Description of the Prior Art

Commercial aircraft flown today often employ directional and vertical gyroscopes to measure the pitch, roll and heading of the aircraft. Newer systems, called Inertial Navigation Systems, employ expensive precision gyroscopes and accelerometer to calculate global positions based on a star fixed reference. Inertial sensing techniques require the measurement of three axes of rate information and three axes of acceleration information. Typical sensors provide only rate or acceleration information and sometimes for only one axis. Rate measurement information provided by various gyroscopic devices, often called gyros, such as conventional gimballed gyroscopes, and tuned rotor gyros can provide two axes of rate information. Other types of gyroscopes, like the Ring Laser Gyro and Fiber Optic Gyro generally provide only one axis of information thus requiring three sensors. Most acceleration sensors provide only one axis of information, again requiring three sensors. A more economical non-navigational inertial strapdown system, called an Attitude and Heading Reference System (AHRS), is also used primarily in small aircraft. The trend in general aviation is toward strapdown sensor technology in a form of AHRS which requires small and low cost rate and acceleration sensors. Although the AHRS is relatively inexpensive compared with full navigation systems, they are more expensive than gimballed, directional and vertical gyroscopes used general aviation aircraft.

New sensors, called multisensors, have emerged in recent years that are less expensive than the gimballed gyroscopes, yet provide sufficient quality for use in an AHRS. These prior art multisensors are described in the following brochures: "A Low-Cost, Multifunction Inertial Sensor for Tactical Applications", by I. Pick The Singer Company and "Low-Cost Piezoelectric rate/acceleration Sensors", by B. F. Rider, G. L. Vick, J. S. Hunter and A. Rodgers for Recoil International Corporations Avionics Group. Multisensors of these two types which measure two axes of rate information and two axes of acceleration information are presently available. These multisensors are attractive because they are capable of measuring two axes of rate information and two axes of acceleration information. However, one is relatively large and heavy and the other is lighter but uses slip rings to extract information. Because slip rings wear out relatively quickly, there's a short Mean Time Between Failure.

A typical AHRS system often uses tuned rotor gyros and servoed accelerometers. Such a system typically uses two gyros and three accelerometers for total cluster of five sensors. The tuned rotor gyros used in a typical AHRS operate in a closed feedback loop using either analog torquing loops or digital torquing loops. Most implementations today use some variation of conventional demodulation techniques for signal extraction. Conventional demodulation techniques involve mixing the analog input information signals down to a base-band, filtering to remove second harmonics and compensating for noise sources. Conventional techniques involve significant analog circuitry that is subject to inherent error from temperature sensitivity, analog noise sources and induced pick-up such as Electromagnetic Interference (EMI). The present invention solves a problem in using a new multisensor sensor by teaching a highly accurate yet cost effective, methods of extracting the sensors rate and acceleration information.

SUMMARY OF THE INVENTION

The present invention teaches an inertial measurement and navigation system using a multisensor whose analog output information is inductively coupled through a pick-off and fed to an analog to a digital converter that passes the signal to a digital signal processor for demodulation. This information is passed to a processor where the direction cosine is computed and then onto the pilot as pitch, roll and heading cockpit display information. Digitizing the signals early in the signal flow reduces some of the noise pick-up typical with analog circuitry. Once the navigation signals have been digitized, all demodulation functions are performed in software as opposed to hardware. The digital demodulation process uses a phase-locked loop to generate local reference waveforms for use in the demodulation process. These waveforms are generated by a digitally controlled oscillator, which is an all-digital counterpart of the classical voltage controlled oscillator. A Hilbert Transform phase detection is utilized in the phase-locked loop.

In the disclosed navigation system, a multisensor output consisting of two axes of acceleration information and two axes of rate information which are fed to an analog to digital converter whose output is passed to a processor where the direction cosine matrix is computed and then onto the pilot as pitch, roll and heading cockpit display information.

BRIEF DESCRIPTION OF THE DRAWINGS

For a better understanding of the invention, reference may be had to the preferred embodiments exemplary of the invention shown in the accompanying drawings in which:

FIG. 3 is a view of the multisensor;

FIG. 7 is a block diagram of a navigation system according to the present invention.

DETAILED DESCRIPTION OF THE PREFERRED EMBODIMENTS

Figure 1:
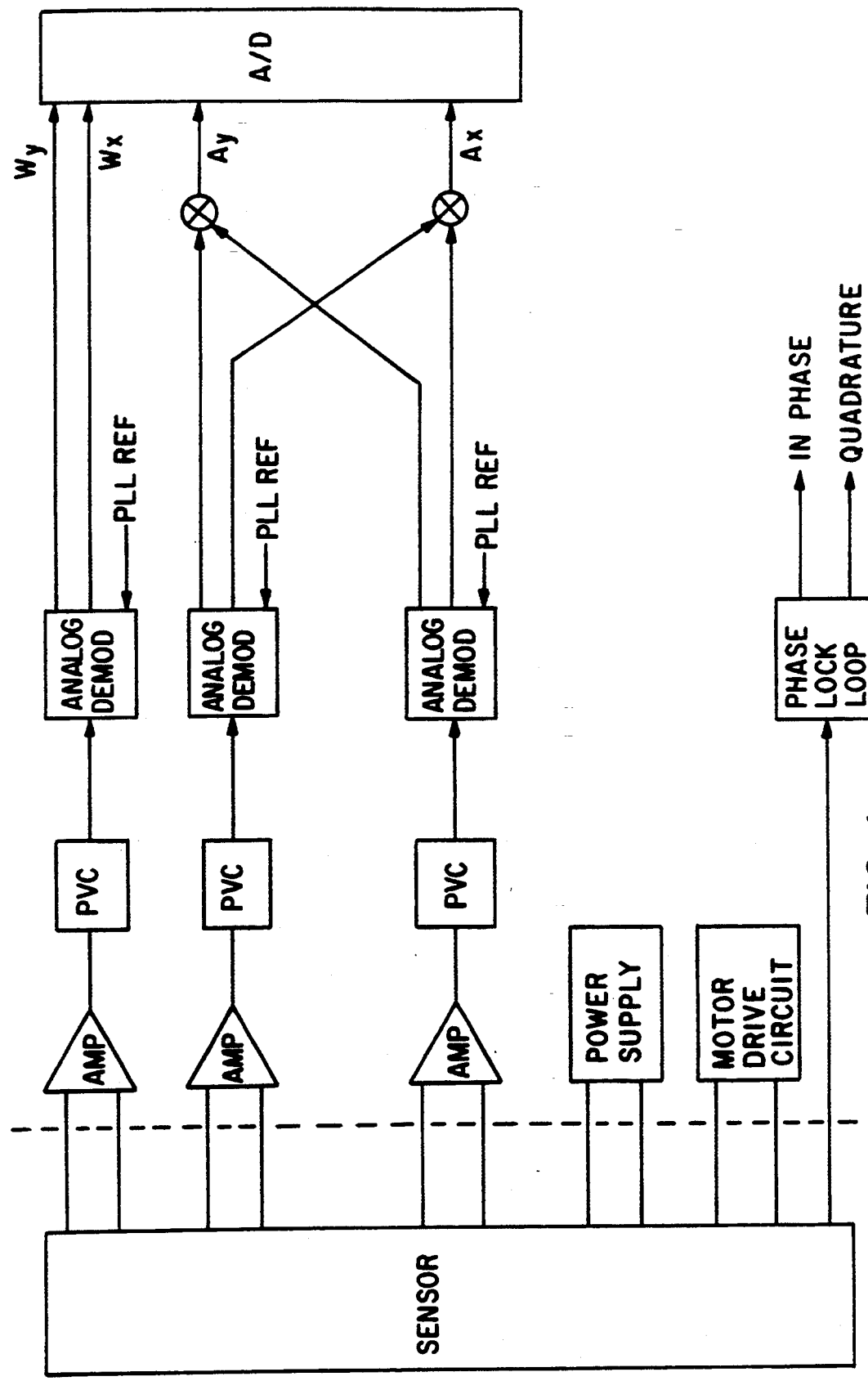
FIG. 1 is a diagram of a navigation system using conventional analog demodulation.

Referring now to the drawings and FIG. 1 in particular there is shown a prior art navigation system using conventional demodulation. In the prior art, conventional demodulation process using amplitude modulation to recover a base band system is a method frequently used to recover rate and acceleration information from a sensor. FIG. 1 illustrates this conventional prior art demodulation technique. A sensor provides a rate or acceleration signal to the analog demodulation circuit. The sensor signal is amplified and fed through a phase to voltage converter and then to the analog demodulator. The sensor is of the type known in the prior art. Demodulation of the sensor signals is extended to include quadrature detection demodulation so as to output the sine and cosine components referenced to the case coordinate system of the sensor. Conventional demodulation techniques can be used with the new multisensor 20 shown in FIGS. 2 and 3.

Figure 2:
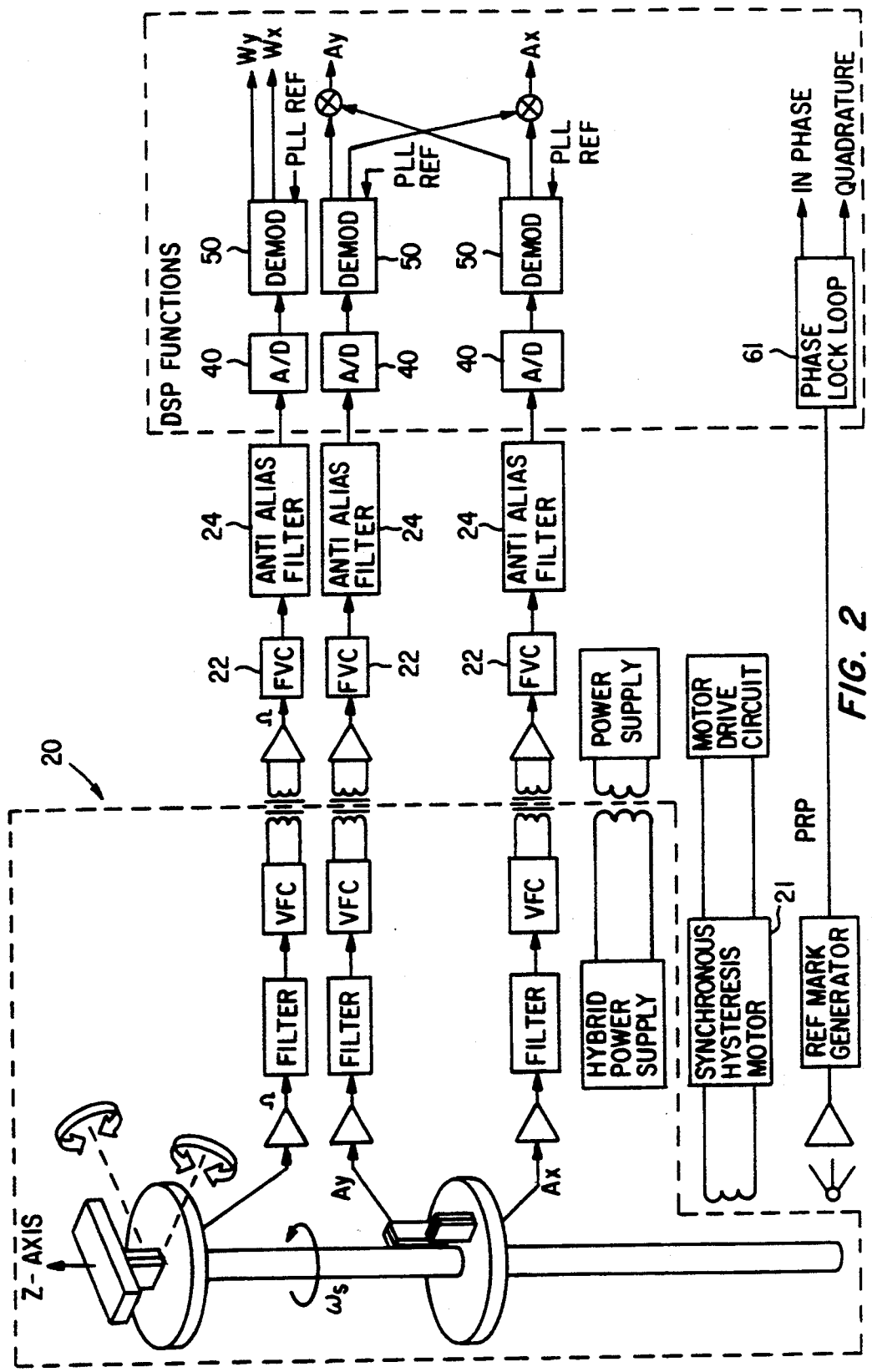
FIG. 2 is a drawing of the sensor section of a navigation system using a multisensor and digital signal processing in accordance with the present invention.

Refer now to FIG. 7 there shown an inertial navigation system according to the teaching of the present invention. Multisensor 20, shown in more detail in FIGS. 2 and 3, provides an output to an analog to digital converter 40 which feeds a digital signal processing (DSP) demodulator 50. The output of digital demodulator 50 feeds AHRS processor 41 which computes the direction cosine matrix which is fed to a digital to analog converter 42. Information from the converter 42 is then provided to the pilot as pitch, roll and heading cockpit display information.

As shown in FIG. 2, the specific sensor 20 used is a multifunction instrument with a rotating platform that provides outputs of two axes of acceleration and two axes of rate. This multisensor utilizes piezoelectric elements to sense angular rates about the Xcase and Ycase axes and linear acceleration components along these two axes. The theory of operation and manufacturing of piezoelectric elements is known and addressed by various manufacturers. The basic principle of operation of these piezoelectric sensing elements can be viewed as a beam cantilevered at one end. When forces are applied, perpendicular to the beam and at the free end of the beam, the piezoelectric element is bent and a small output voltage is generated. This voltage is linearly proportional to the applied specific force. Because of this bending action, these piezoelectric elements are often referred to as benders.

The spin axis shaft is suspended by bearings and is rotated by an electric motor 21. Attached to the rotating shaft is a disk on which the rate and acceleration sensing piezoelectric components and hybrid electronics circuits are placed. Input power and output signals are coupled between the rotating and stationary parts of the sensor members through rotary inductive transformers.

A signal flow diagram of the piezoelectric multisensor is illustrated in FIG. 2. It shows bender elements mounted on a rotating platform with their sensitive axis oriented to detect two axes of acceleration and two axes of rate. For a given deflection of the piezoelectric element, its output decays over time. This requires the element to be rotated through the applied force, to generate a constant peak amplitude oscillating output.

The piezoelectric sensing elements are not electrically excited and therefore operate in an open loop fashion generating AC voltages proportional to the applied force. Open loop operation eliminates the sophisticated rebalance electronics which are required for typical closed loop sensors. The AC signals generated by the piezoelectric elements are amplified by an internal preamplifier and then demodulated externally. In an AHRS application these extracted measurements are input to the main processor for sensor error compensation and vehicle attitude computation.

Acceleration signals proportional to applied acceleration are generated by the rotating piezoelectric cantilevered beams with tip masses. These acceleration benders are orientated with their longitudinal axis parallel to the rotating shaft axis and their sensitive axis perpendicular to the shaft. The benders deflect under linear accelerations in the plane perpendicular to the spin axis. Each piezoelectric element generates an electrical signal whose amplitude is proportional to that deflection and whose frequency equals the shaft rotation speed. The tip masses are added to increase the acceleration sensitivity.

Rate signals proportional to applied motion are generated by rotating piezoelectric cantilever beams with tip masses. These rate benders are orientated with their longitudinal axis perpendicular to the rotating shaft axis, and their sensitive axis parallel to the shaft. The rate benders deflect under Coriolis accelerations from motion about an axis perpendicular to the spin axis and generate an electrical signal with amplitude proportional to the applied motion.

The signal conditioning electronics reside on a rotating thick film hybrid board on the rotating structure. This conditioning circuitry consists of operational amplifiers, filters and voltage-to-frequency converters that create digital pulses for passing the output signals of the piezoelectric elements from the rotating structure to the stationary housing through inductive transformer coupling. These digital pulse trains are output from the sensor. To recover the original sinusoid signal, these pulses need to be run through a frequency-to-voltage converter 22 which is contained in the electronics external to the sensor.

Electrical power is provided to the rotating power supply hybrid board through an inductive rotary transformer. The secondary of the transformer is attached to the rotating shaft; the primary is fixed in the case. The power signal is inductively coupled from the stationary member to the rotating member through small air gap.

An optical position pickoff is used to reference the phase of the output signals relative to the case alignment pins and hence the input rate and acceleration components. This pickoff is physically phase locked to the rotating elements. The general characteristics of the multisensor are shown below.

| Multisensor General Characteristics | |
|---|---|
| Bandwidth | 25 Hz |
| MTBF | 9000 h |
| Operating Temperature | −55 to +70° C. |
| Power | 12 watts start |
| | 6 watts run |
| Weight | 400 grams |
| Size | 2.0″ diag × 2.2″ long |

In describing applicants invention, the following symbols are useful:

$\omega$ = Sensor spin speed
PRP = Phase Reference Pulse
Xcase = Sensor X case axis
Ycase = Sensor Y case axis
$A_x$ = Input Accel. along the sensor X case axis
$A_y$ = Input Accel. along the sensor Y case axis
$A_1$ = Accel. Voltage output from sensing bender #1
$A_2$ = Accel. Voltage output from sensing bender #2
$A_{xcase}$ = Accel. Demod. output WRT the X case axis $A_{ycase}$ = Accel. Demod. output WRT the Y case axis
$\Omega_x$ = X case rate input to the sensor
$\Omega_y$ = Y case rate input to the sensor
$\Omega$ = Output from the rate bender.
$\Omega_{xcase}$ = Rate Demod. output WRT the X case axis
$\Omega_{ycase}$ = Rate Demod. output WRT the Y case axis
$\alpha$ = Sensor misalignment angle
$\theta$ = PLL Error angle
G = Gravitational Field of the earth
H = Strength of the $2\omega_s$ vibration input
$k_1$ = Gain for Bender #1
$k_2$ = Gain for Bender #2
I = Inphase DCO output
Q = Quadrature DCO output
$W_x$ = Demodulated rotation rate about the X case axis
$W_y$ = Demodulated rotation rate about the Y case axis Each sensor 20 outputs four signals: PRP, $\Omega$, $A_1$, and $A_2$.

The PRP is output one time per revolution of the rotating platform and can be used to reference the phase of the output signals. The PRP is always lined up with the peak amplitude of the $A_x(t)*\cos(w_s t)$ waveform. Notice that two acceleration outputs are needed in cases where a vibration at twice the spin frequency adds an error portion to the x or y acceleration measurement. It is necessary to use the other Y or X channel to measure the magnitude of this error signal to subtract it out. This is done by using two accelerometers in the sensor which are mounted 90 degrees out of phase. In this way the x accelerometer experiences the full effect of the Ycase acceleration as it rotates to a position 90 degrees out of phase from the Xcase axis.

A mathematical description of the acceleration and rate signals that are output from the sensor and an explanation of the demodulation process is provided below.

The sensor 20 outputs are represented in the following equations.

$$A_1 = k_1 A_x(t)\cos(\omega_s t) + k_1 A_y(t)\sin(\omega_s t) \quad (1)$$

$$A_2 = k_2 A_x(t)\sin(\omega_s t) - k_2 A_y(t)\cos(\omega_s t) \quad (2)$$

Where $A_x(t)$ and $A_y(t)$ are the input specific forces of acceleration as referenced to the sensor's case and $\omega_s$ is the spin frequency of the rotating elements of the sensor. The symbols $k_1$ and $k_2$ represent the gains of that particular piezoelectric bender element.

The demodulated signal outputs are formed by sending the sensor outputs through the demodulator where they are resolved into the Xcase and Ycase coordinate system. The mathematical expression of the signals which are output from the demodulator are:

$$A_{xcase} = A_1\cos(\omega_s t) + A_2\sin(\omega_s t) \quad (3)$$

$$A_{ycase} = A_1\sin(\omega_s t) - A_2\cos(\omega_s t) \quad (4)$$

Notice that each demodulated case signal is a combination of both of the sensor output signals. For example, to make the Xcase measurement, the demodulator needs to combine the $A_1$ signal part with the $A_2$ signal. The rate sensor outputs are represented in the following equation.

$$\Omega = \Omega_x\cos(\omega_s t) + \Omega_y\sin(\omega_s t) \quad (5)$$

The demodulated rate signals are shown in equations 6 and 7.

$$\Omega_{xcase} = \Omega\cos(\omega_s t) \quad (6)$$

$$\Omega_{ycase} = \Omega\sin(\omega_s t) \quad (7)$$

Multisensor 20 may be mounted in an aircraft to measure body, rates, and accelerations. Two such sensors 20 provide three axes of rate information and three axes of acceleration information plus one redundant axis of rate and acceleration information. As pointed out above, the output of the sensor 20 consists of one rate signal, two acceleration signals and one phase reference pulse train (PRP). The rate and acceleration output signals are sinusoids with amplitudes proportional to the applied external specific force and with a frequency of 100 Hz, the spin frequency of the rotating sensing platform of sensor 20. The analog PRP is output by the sensor once each revolution of the rotating head assembly. The pulse indicates the phase position of the rotating platform with respect to a fixed position on the case of sensor 20.

In using sensors 20, it is necessary to demodulate the three output signals and resolve them into the corresponding case coordinate system, whose axes are defined as Xcase, Ycase and Zcase as shown in FIG. 3. According to the present invention, this is accomplished using digital signal processing techniques.

FIG. 2 shows the details of extracting the desired signals. The signals from sensor 20 are connected to an analog to digital converters 40 and passed to the digital signal processor demodulator 50. In an AHRS this information is passed to the AHRS main processor where the direction cosine matrix is computed and then onto the pilot as pitch, roll and heading cockpit display information.

Figure 4:
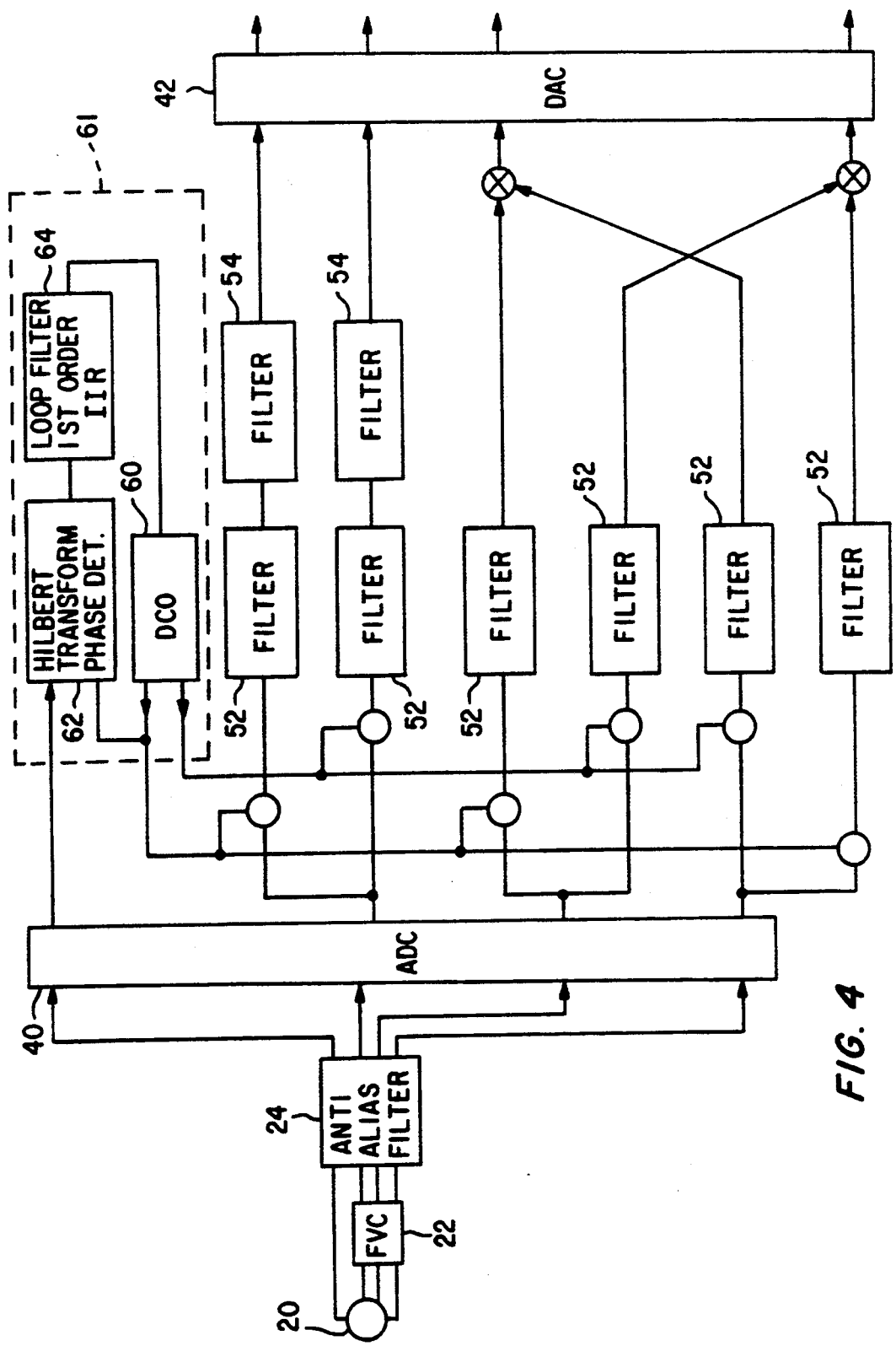
FIG. 4 is a diagram of an inertial navigation system according to the present invention showing the digital demodulation function in more detail.

The demodulation circuit shown in FIGS. 2 and 4 contains the gain control, filtering and quadrature detection to extract the desired X-case and Y-case information. When the digital signal processing signal is implemented using discreet electronics, an additional noise floor is added to the processed signal. Given that the scale factor of the rate sensing element is about 0.35 microvolts per degree per hour (uV/°/h) and a one sigma signal stability of 5°/h is required any additional noise introduction presents problems. If the signals can be digitized early in the signal flow, digital processing can reduce some of the noise pick-up typical of analog circuitry. Once the signals have been digitized all functions are performed in software as opposed to hardware.

Analog methods can be used for demodulation but they have serious short-comings. In the analog implementation of the demodulation process the sensor 20 output signal is first converted from frequency to voltage and then run through synchronous quadrature detector circuitry which modulates the 100 Hz signal of interest to DC and 200 Hz. The 200 Hz is removed with low-pass filters that are set to preserve the 25 Hz required bandwidth. The PRP is run into an analog PLL which is set up to generate both an in-phase and quadrature square wave for use in a synchronous quadrature detector. The mixing operation is performed via discrete switches that are turned on and off at the appropriate times so as to perform a full-wave rectifier operation. Conventional operational amplifier circuits perform all analog tasks involved such as output filtering to remove the 200 Hz component.

Analog circuits are subject to many error sources including temperature sensitivity, noise, and induced error voltages from EMI. These error sources can be addressed in traditional ways, but due to the small scale factor of the output signals any additional noise presents difficulty and such sources must be carefully studied.

Temperature compensation can be performed to minimize the errors such as bias drifts due to temperature but these require knowledge of the system often acquired from empirical testing. Such testing is time consuming and therefore expensive.

Noise encountered in analog circuits and can generally be classified into a few specific categories such as Johnson noise, flicker or 1/f noise, shot (or Schottky) noise and popcorn noise. The error contribution of each noise must be studied and weighed to determine a correct method of reduction. This process adds cost and time delays to the final product. EMI problems can be reduced by various methods such as correct shielding and grounding techniques.

Although methods are available to reduce the effects of these error sources, complete elimination is not possible. Great effort can be spent at considerable cost attempting to reduce these effects. The present invention minimizes these effects by using the disclosed digital signal processing for demodulation rather than the prior art analog methods.

A preferred embodiment of the invention is illustrated in FIG. 4 where the demodulation process has been implemented within the DSP processing software. In this method rate and acceleration signals coming from the sensor 20 are converted from frequency to voltage by a converter 22 to recover the original sinusoids generated by the rotating sensor elements. These sinusoids are digitized with an analog to digital converter (ADC) 40 and the digitized representations of the signals are fed to the DSP processor. Thereafter all processing is done digitally via software.

Several benefits are obtained from the use of this new method. With conventional methods, almost the entire circuit is analog and subject to all the previously mentioned problems, but in the disclosed method the analog circuitry is reduced to a frequency-to-voltage converter 22, an anti-alias filter 24 and ADC 40. Since the signals are digitized early in the signal flow, each of the error sources mentioned previously in describing convention demodulation are reduced or eliminated.

The demodulation implementation illustrated in FIG. 4 is carried out within the DSP processing software. The process begins by inputting the PRP, which is a non-50% duty cycle waveform. The PRP is treated as an analog signal and input through the ADC 40. The PRP signal is then Hilbert transformed by Hilbert transform circuit 62 and input to the phase locked loop (PLL) which tracks the first harmonic of the PRP by rejecting other frequencies. This technique is commonly used to extract a signal from noise. The phase locked loop 61 includes the Hilbert transform 62, the loop filter 64 and the digital controlled oscillator 60.

The PLL 61 uses the PRP to generate a local reference waveforms for use in the demodulation process. These waveforms are generated by a Digital-Controlled Oscillator (DCO) 60, which is an all-digital counterpart of the classical Voltage-Controlled Oscillator. The DCO generates two output signals, an in-phase (cos($\omega_o t$)) signal, I, and a quadrature (sin($w_o t$)) signal, Q.

The demodulation process is performed by mixing these reference signals with each of the three input signals ($\Omega$, $A_1$ and $A_2$). Each of these forms an in-phase and quadrature output component. The basic loop update rate was chosen to be 8 kHz. During this time an input data sample is taken, all computations are performed once and the results are output to the Digital to Analog Converter (DAC) 42 for display on a oscilloscope or stored in memory for off-line uploading to a PC.

The information of interest is the DC term. This requires the 2nd harmonic be reduced or removed by an output filter section. The complete removal could be accomplished by a Moving Average Filter (MAF) consisting of a Finite Impulse Response (FIR) filter that had exactly the same number of taps as contained in an integral period of the 2nd harmonic. Since this MAF can actually eliminate the $2w_s$ terms, it was strongly considered, but since the $w_s$ can vary due to changes in the hysteresis motor of the sensor, the amount of rejection of that term varied. It was determined that the best output filter consisted of a 5th order elliptical filter 52 set at a cutoff frequency of 25 Hz with a stop band attenuation of 60 dB at 200 Hz. This filter 52 was chosen because of its continued rejecting ability as the PLL tracked the changing $w_s$. Because of the very tight stability requirement on the rate channel, the elliptical filter was followed by a 2nd order Butterworth filter 54 which provided an additional 30 dB rejection of the $2w_s$ term. The Butterworth filter 54 was cascaded instead of increasing to a 7th order elliptical filter to get the increasing attenuation at the higher frequencies.

Figure 5:
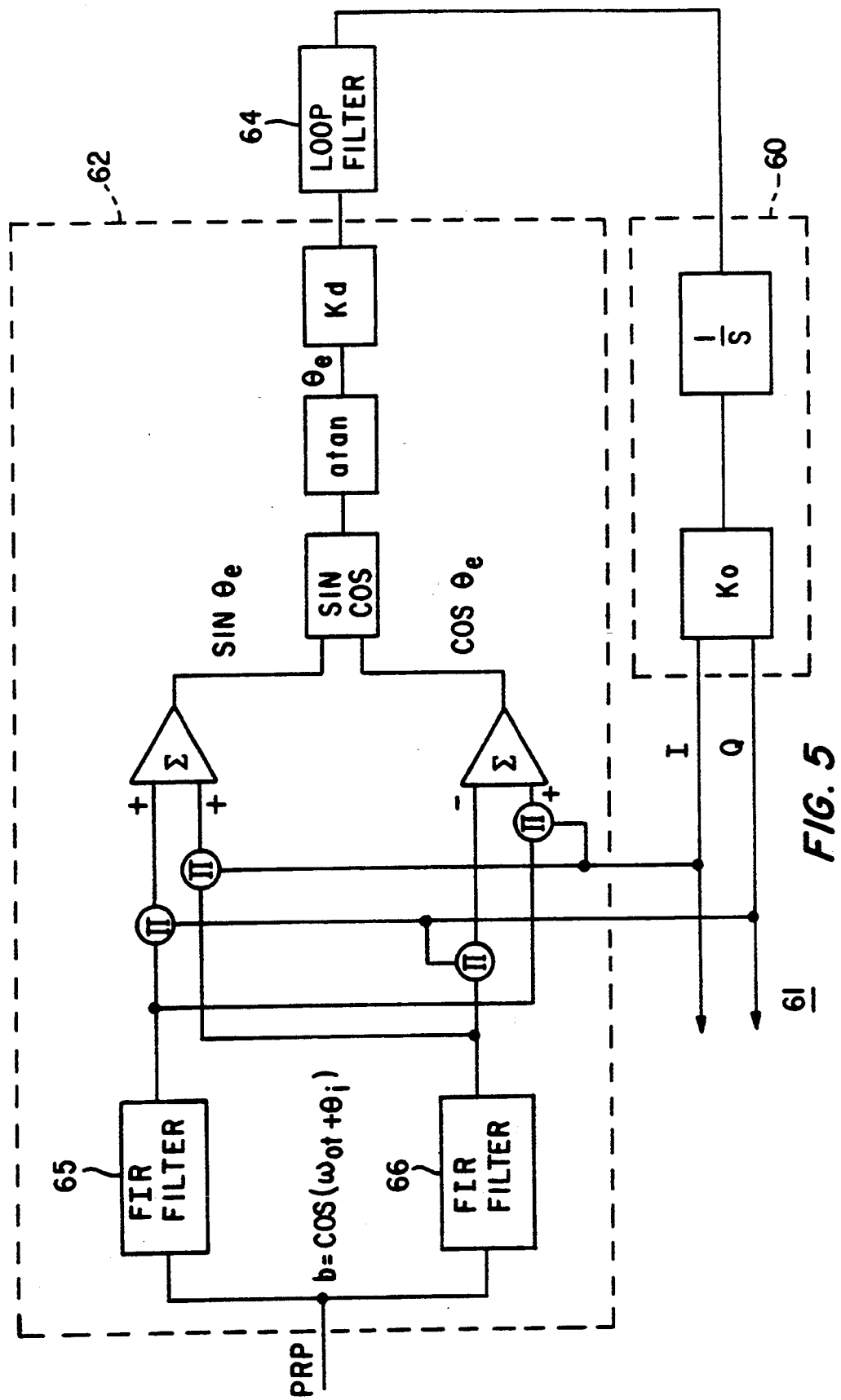
FIG. 5 is a diagram showing in more detail the phase-locked loop circuit shown in FIG. 4.

The PLL 61 portion of the loop is illustrated in FIG. 5. The building blocks are the DCO 60, the Hilbert Transform Phase detector 62 and the Loop Filter 64.

The basic DCO is set to oscillate at a nominal frequency of 100 Hz with the ability to oscillate from about 70 Hz to about 130 Hz. The DCO used generates in-phase (I) and quadrature (Q) output signals, where:

$$Q = \sin(w_0 * t + \theta_0) \tag{8}$$

and $$I = \cos(w_o * t + \theta_o) \tag{9}$$

A Phase Detector is used to determine the phase error ($\theta_e$) difference between the incoming reference signal and the signal generated by the DC0. The method of phase detection implemented is called a Hilbert Transform (HT) Phase Detector. The incoming signal is of the form:

$$\cos(w_0 * t + \theta_i) \tag{10}$$

The Hilbert Transform is implemented via a complex filter using two real FIR filters 65, 66 whose components are generated via exponential modulation of a sixty three tap low-pass FIR filter. The complex filter was implemented as two separate sixty three tap FIR filters, one for the real part of the signal and the other for the complex part. This is possible since the incoming signal is itself a real signal.

A Loop Filter 64 is used to filter the phased locked loop feedback phase error and to set the shape of the response. From the appropriate mathematical operations, as illustrated in FIG. 5, the phase error, $\theta_e$, can be found.

$$\theta_e = \theta_i - \theta_o \tag{11}$$

This phase error is filtered and the resulting voltage commands the DCO 60 to operate at a frequency such as to produce phase lock. The loop filter 64 used is a single pole low-pass with a cutoff frequency of 10 Hz. The bandwidth of this loop filter 64 must be capable of tracking changes in the spin speed ($\omega_s$) of the sensor which are small over one revolution.

The PLL open loop transfer function can be determined from FIG. 5 to be:

$$TX_{OL}(s) = K_d * K_f * K_o / (s*(\tau s+1)) \quad (12)$$

where:

f = Loop Filter cutoff frequency = 10 Hz
$\lambda$ = Loop Filter time constant = $1/(2\pi f)$ = 0.0159 s/rad
$K_d$ = phase detector gain = 1 V/rad
$K_f$ = filter gain = 1 V/V
$K_o$ = DCO gain = $2\pi f/10$ rad/s/V = 62.8 rad/s/V and using the standard control theory LaPlace symbols of G(s) and H(s) yields:

$$TX_{OL}(s) = G(S)H(S) = \frac{K_0}{(s*(\tau s + 1))} \quad (13)$$

$$TX_{OL}(s) = \frac{62.8}{(s*(0.0159s + 1))} \quad (14)$$

from which the closed loop transfer function is determined to be:

$$TX(s) = \frac{G(s)H(s)}{(1 + G(s)H(s))} = \frac{(K_0/\tau)}{(s^2 + s/\tau + K_0/\tau)} \quad (15)$$

The natural frequency can be computed to be:

$$\omega_0 = \sqrt{(K_0/\tau)} = 62.8 \text{ rad}/s$$

And from the well known relationship ($2\zeta\omega_0 = 1/\tau$), the damping is computed to be:

$$\zeta = 0.5$$

During the design effort the DCO gain ($K_o$) was initially set to $2\pi f/10$ where f=100 Hz. The loop stability was evaluated empirically while adjusting $K_o$. Good performance was achieved with this gain. Bode analysis was done to determine the relative stability of the design and the loop phase margin was calculated to be 52 degrees. A rule of thumb is that to achieve good stability the phase margin must be at least 45 degrees, which is met in this design.

As stated earlier, the two acceleration inputs provide cancellation of vibration induced signals. The compensation is implemented in the lower right-hand portion of FIG. 4. The $A_x$ in-phase component is cross fed and summed to the $A_y$ Quadrature component, reducing the unwanted signal that was induced by the experienced $2w_s$ vibration. The process is repeated for the $A_{ycase}$ component.

Two accelerometer outputs and one rate output from the sensor need to be input to the DSP. The final outputs from the DSP are the demodulated rates ($\Omega_{xcase}$ and $\Omega_{ycase}$) and accelerations ($A_{xcase}$ and $A_{ycase}$).

Figure 6:
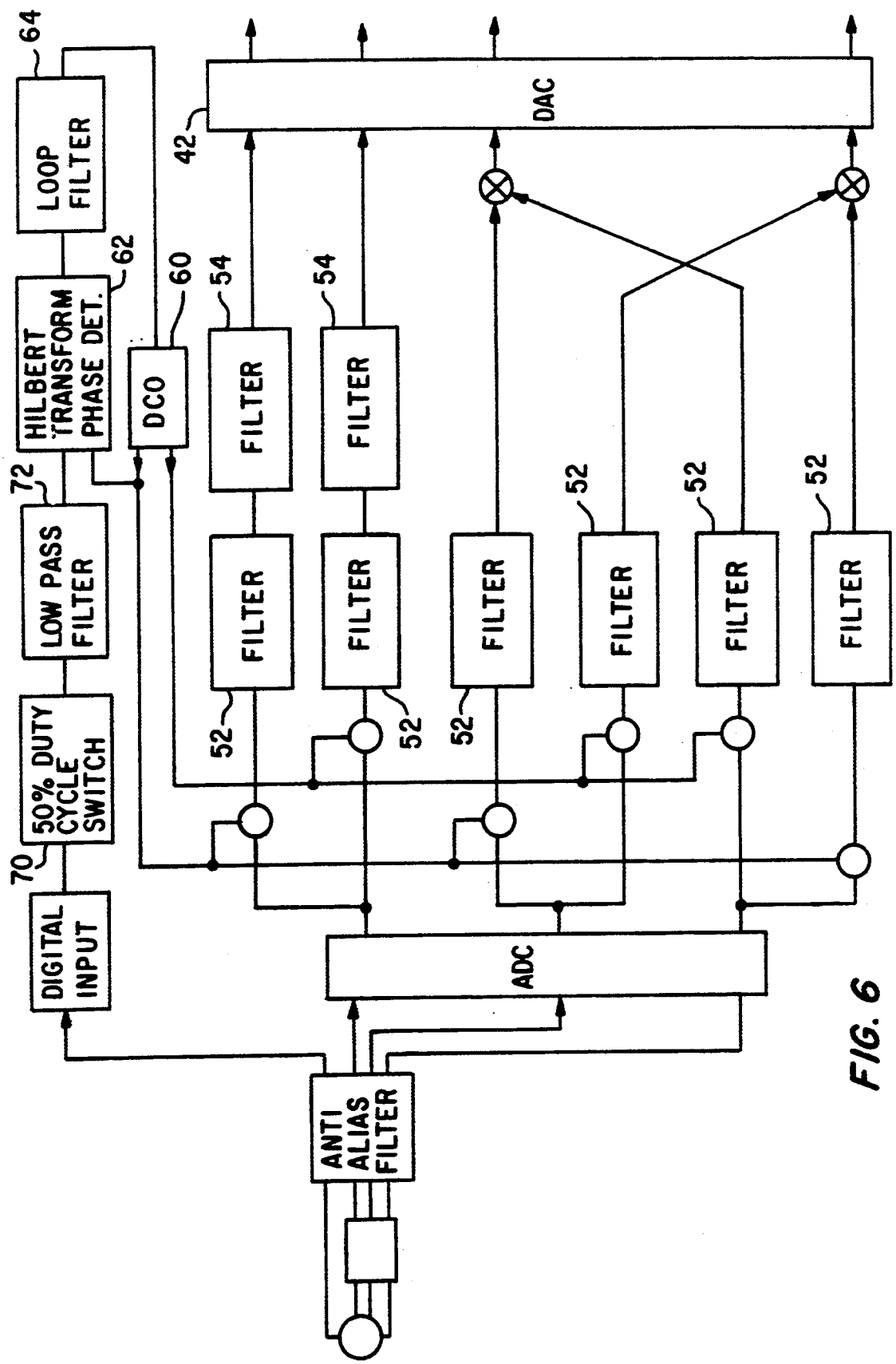
FIG. 6 is a diagram similar to FIG. 4, showing another embodiment of the invention.

Refer now to FIG. 6 there shown another embodiment of the invention. The embodiment shown in FIG. 6 is referred to as the digital implementation of inputting the PRP. The digital approach uses the digital logic input of the DSP card and inputs the PRP as '0' or '1' logic levels without going through the ADC 40. This approach begins by inputting the PRP which is a non-50% duty cycle waveform. This signal is sampled and normalized, using knowledge of the previous PRP input cycle, into a 50% duty cycle waveform by a general 50% duty cycle switch 70 and then filtered with a 100 Hz low-pass filer 72 to extract the 1st harmonic. This newly generated sinusoid is Hilbert Transformed and input to the PLL where the demodulator's local reference oscillators are generated.

The digital PRP approach appeared attractive in that the PRP is itself a digital signal so it was appropriate to treat it as such. In the actual implementation the loop limit cycle time of 125 us was enough to cause a noticeable beat to be detected between the input PRP and that waveform as read by the digital input. This implementation while theoretically attractive yielded less satisfactory results than the embodiment of the invention shown in FIG. 4.

The disclosed digital signal processing is excellent for handling the high accuracy requirements of an inertial navigation system. The disclosed digital signal processing device is easy to use and reduces development time and cost. Also testing time is reduced since temperature testing, air compensation and re-test cycles will be reduced. The digital signal processing demodulation also reduces the amount of conventional demodulation analog circuitry required with its inherent temperature sensitivities and noise sources. Although some analog circuitry is still required, such as anti-alias filters, the majority of the analog circuitry is eliminated.

With the reduction in the amount of analog circuitry, temperature sensitivity is reduced and improved immunity to circuit noise and EMI is achieved. As stated earlier in this paper, the signal dynamic range is about 120 dB, but since the dynamic range of the DSP's floating point arithmetic is about 1500 dB the computations do not contribute significant noise.

With the present invention the time required to make changes is also reduced. Since simulations normally need to be done, code is already written so only a cross compiler operation is necessary to use the DSP. Changes can be implemented with great ease therefore reducing the effort and time required to make wiring and circuit changes to a prototype board.

Reducing the amount of analog circuitry reduces temperature sensitivity and improves immunity to circuit noise and EMI. Error sources present in prior art conventional demodulation devices are reduced or eliminated. Digital signal processing techniques are inherently immune to many of the usual error sources. Furthermore, since the digital signal processing is a digital computing process it has a large dynamic range that is limited only by the arithmetic precision. The disclosed digital signal processing approach with inertial navigation sensors is new. Although various sources have published articles describing improved analog techniques, the use of digital signal processing techniques is foreseen to be the preferred method in the future. The digital signal processing techniques combined with the multisensor result in a new low-cost AHRS.

I claim:

1. A navigation system using digital signal processing techniques for extracting information from a multisensor which provides analog acceleration and rate information and a phase reference signal comprising:
- a phase locked loop responsive to the phase reference signal for generating reference signals for use in demodulation;
- an analog to digital converter for converting the analog acceleration and rate information from the multisensor to digital acceleration and rate information;
- digital signal processing and demodulator means for mixing the phase locked loop reference signals with the digital acceleration and rate information and using the result for computing the direction cosine matrix;
- display means responsive to the computed direction cosine matrix tier displaying pitch, roll and heading information and wherein said phase locked loop comprises,
- a Hilbert transform phase detector which tracks the first harmonic of the phase reference signal;
- a loop filter connected to said Hilbert transform phase detector for filtering the phase locked loop-phase error signal; and,
- a digital controlled oscillator connected to said loop filter for generating an in-phase reference signal and a quadrature reference signal which provide feedback to the Hilbert transform phase detector and which are used in demodulation.

2. A navigation system for a pilot comprising:
- a multisensor providing output signals with two axes of acceleration information and two axes of rate information and a reference pulse output:
- an analog to digital converter connected to receive the output signals of said multisensor and convert the analog signals to digital signals;
- demodulation means connected to said analog to digital converter for demodulating the digitized output signals from said analog to digital converter:
- digital signal processing means connected to receive the output signal information from said demodulation means for computing the direction cosine matrix:
- display means communicating with said digital signal processing means via a digital to analog converter to provide the pilot with cockpit display information for pitch, roll and heading; and,
- a phase locked loop receiving the reference pulse output and providing signals to said demodulation means which are used for demodulating the digital output signals from said analog to digital converter and said phase locked loop comprises,
- a Hilbert transform phase detector which receives the reference pulse output from said multisensor:
- a loop filter connected to receive the output of said Hilbert transforms phase detector, and,
- a digital controlled oscillator connected to said loop filter and providing output signals to said demodulation means and feedback to said Hilbert transform phase detector.

3. A navigation system comprising:
- a multisensor providing a reference pulse output and acceleration and rate information outputs:
- an analog to digital converter for receiving the acceleration and rate information from said multisensor;
- a digital signal processing demodulator responsive to the outputs from said analog to digital converter;
- a phased locked loop responsive to the phase reference pulse from said multisensor and providing reference signals for use by said digital signal processing demodulator and including a Hilbert transform phase detector which receives the reference pulse output and feeds a loop filter having an output which is fed to a digital controlled oscillator whose output is fed back to said Hilbert transform phase detector and is the reference signals used by said digital signal processing demodulator; and,
- processor means connected to receive the output from said digital signal processing demodulator for computing the direction cosine matrix and displaying pitch, roll and heading information.

* * * * *